April 6, 1948.
E. V. TAYLOR
2,439,028
FOOD GRINDER HAVING A PERFORATED DISC,
A PRESSER PLATE, AND A ROTARY KNIFE
Filed March 22, 1946
3 Sheets-Sheet 1
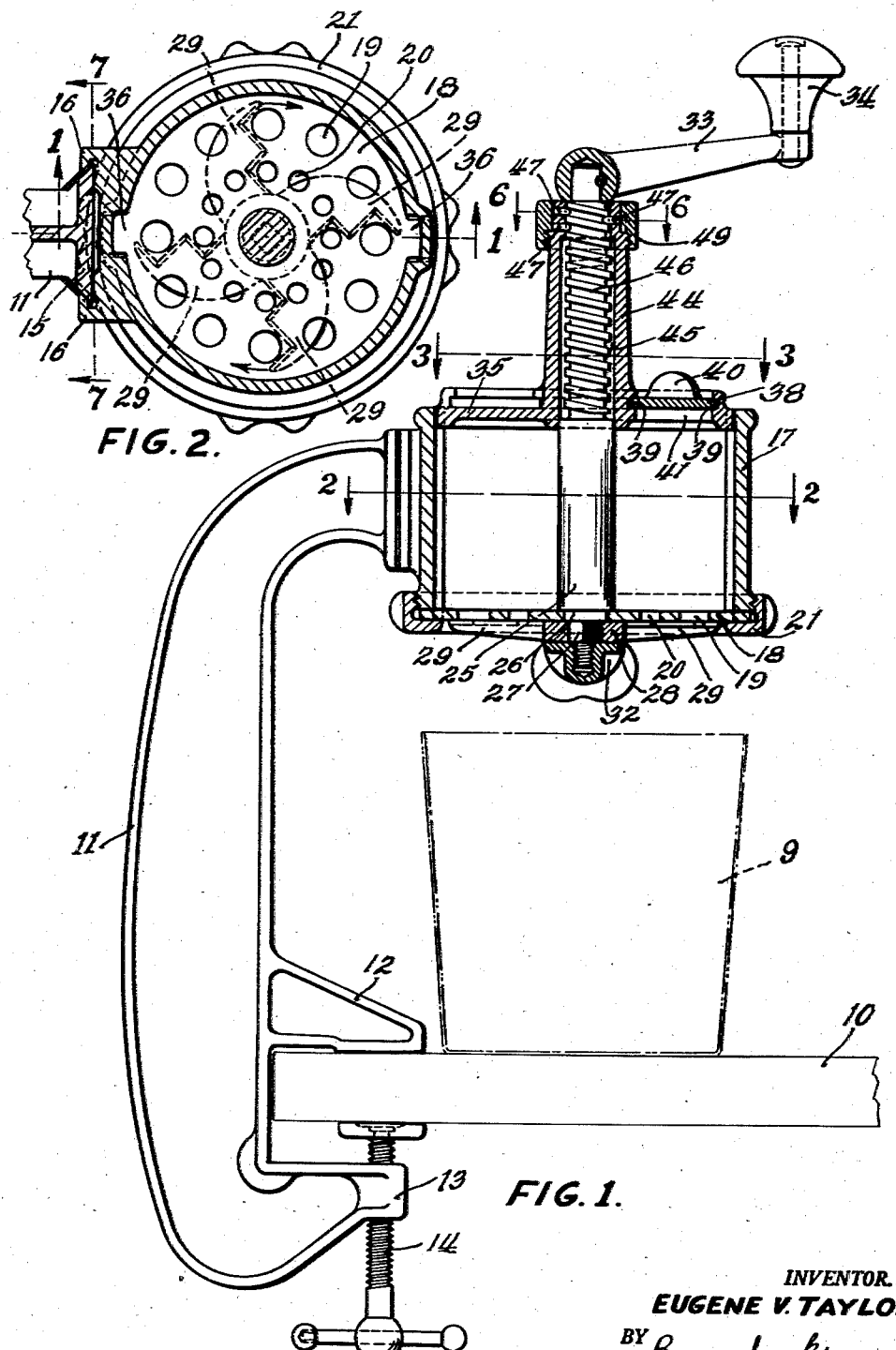
INVENTOR.
EUGENE V. TAYLOR

INVENTOR.
EUGENE V. TAYLOR

April 6, 1948.  E. V. TAYLOR  2,439,028
FOOD GRINDER HAVING A PERFORATED DISC,
A PRESSER PLATE, AND A ROTARY KNIFE
Filed March 22, 1946   3 Sheets-Sheet 3

INVENTOR.
EUGENE V. TAYLOR

Patented Apr. 6, 1948

2,439,028

UNITED STATES PATENT OFFICE 2,439,028

FOOD GRINDER HAVING A PERFORATED DISC, A PRESSER PLATE, AND A ROTARY KNIFE

Eugene V. Taylor, Chicago, Ill.

Application March 22, 1946, Serial No. 656,322

5 Claims. (Cl. 146—192)

My invention relates, generally, to apparatus for processing food stuff and has particular relation to choppers for meat, vegetables and the like.

The object of my invention, generally stated, is to provide apparatus for processing food stuff which shall be simple and efficient in operation, readily cleaned, and which may be readily and economically manufactured and used.

Another object is to so position the operating screw of a meat chopper or the like that it is not required to contact the food stuff being processed.

A further object is to move a pusher plate by a manually operable screw to force the food stuff in a hopper through a die and to cut the same as it emerges therefrom.

A still further object is to disengage the mechanical connection between the screw and pusher plate at or near the end of the inward stroke of the latter so as to permit withdrawal of the pusher plate from the hopper without requiring that the screw be operated in a reversed direction to effect the same.

Another object is to provide a pressure resisting aperture cover for an aperture through which the food stuff may be introduced into the hopper.

Still another object is to non-uniformly space the blades of the cutter so as to distribute their cutting action and reduce the torque required to operate the same.

A further object is to provide both vertical and horizontal mountings for the hopper.

Another object is to provide for rolling the food stuff into and through the die.

Other objects of my invention will, in part, be obvious and in part appear hereinafter.

My invention is disclosed in the embodiments thereof shown in the accompanying drawings and it comprises the features of construction, combination of elements and arrangement of parts which will be exemplified in the constructions hereinafter set forth and the scope of the application of which will be indicated in the appended claims.

For a more complete understanding of the nature and scope of my invention reference may be had to the following detailed description, taken together with the accompanying drawings, in which:

Figure 1 is a view of one embodiment of my invention, the support being shown in elevation and the hopper and operating parts associated therewith being shown in section, the section being taken along the line 1—1 of Figure 2;

Figure 2 is a detail sectional view, taken along the line 2—2 of Figure 1;

Figure 3:
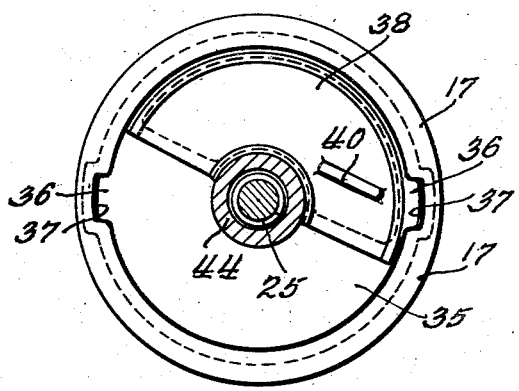
Figure 3 is a detail sectional view, of the hopper taken along the line 3—3 of Figure 1.
Figure 4:
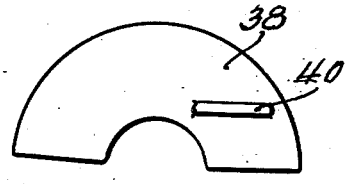
Figure 4 is a top plan view of the slide cover for the aperture in the pusher plate.

Referring now particularly to Figure 1 of the drawings, it will be noted that the reference character 9 designates the outline of a suitable container into which food stuff, processed in accordance with the present invention by the apparatus disclosed herein, can be placed. The container 9 and the food processing apparatus may be mounted on a suitable table top or a shelf, indicated at 10. A support 11 is provided having jaws 12 and 13 which are spaced apart. A screw clamp 14 is threaded in the jaw 13 and cooperates with the jaw 12 for holding the support 11 firmly to the table top or shelf 10.

At its upper end the support 11 has a dove-tail portion 15 which has a double taper to cooperate with oppositely tapered dove-tail portions 16 of a hopper 17 for holding the latter firmly in place on the support 11 while at the same time permitting ready removal thereof. The support 11 may be formed of any suitable material such as a die casting while the hopper 17 is preferably formed of material which is unaffected by coming into contact with food stuff. For example, the hopper 17 may be formed of aluminum or similar material.

The hopper 17 is preferably circular in shape and it has at its lower end a die 18 in which are provided a series of large apertures 19 and another series of small apertures 20, as is more clearly shown in Figure 2 of the drawings. The die 18 may be held in place at the bottom of the hopper 17 by a clamp nut 21.

In accordance with the present invention food stuff, such as meat or the like to be processed, is placed in the hopper 17. As will appear hereinafter, means are provided for pushing the contents of the hopper 17 through the apertures 19 and 20 in the die 18. As the food stuff emerges from these apertures it is cut to further comminute the same before it falls into the container 9. The apparatus for moving the food stuff through the hopper 17 and cutting the same is mounted on a shaft 25 that is mounted for rotation about a vertical axis. Near its lower end the shaft 25 has a reduced bearing portion 26 which interfits with a correspondingly shaped aperture in the die 18 and which acts as a bearing for the lower end of the shaft 25.

Just below the bearing portion 26 of the shaft 25 is a square section 27 which is arranged to receive a cutter or a knife 28 having blades 29 radially extending therefrom. As shown more clearly in Figure 2, four blades 29 are provided and they are symmetrically located and have suitable cutting edges for severing the food stuff as it emerges from the apertures 19 and 20.

The knife 28 is held in place on the lower end of the shaft 25 by a wing nut 32. At its upper end the shaft 25 is provided with a handle 33 which carries a knob 34 at its outer end that may be manually grasped and rotated by the operator.

With a view to moving the food stuff in the hopper 17 through the same and through the apertures 19 and 20 and the die 18 a pusher plate 35 is provided. The pusher plate 35 is generally circular in shape, corresponding to the inner periphery of the hopper 17, and it has a pair of radially outwardly extending bosses 36 which interfit with slots 37 in the hopper 17. The pusher plate 35 is thereby guided in the hopper 17 and is prevented from rotating relatively thereto while at the same time it is free to move in and out of the hopper 17.

As shown more clearly in Figure 1, the pusher plate 35 has an arcuate aperture 41 therein through which the food stuff may be placed into the hopper 17. A slide cover 38, Figure 3, corresponding in shape to the aperture 37, is provided for closing the same. The cover 38 is wider in the radial dimension than is the aperture 37 so that the edges thereof interfit with grooves 39 which are located opposite each other in the pusher plate 35, shown more clearly in Figure 1. A projection 40 extending upwardly from the slide cover 38 permits movement of the same from and to the closed position.

It will be observed that the slide cover 38 moves with the pusher plate 35. The construction is such that the slide cover 38 serves to apply pressure to the food stuff in the hopper 17 the same as does the remainder of the pusher plate 35. While the pusher plate 35 is illustrated as being recessed on its underside and the slide cover 38 is shown as spaced somewhat from the lower surface thereof, it will be understood, that if desired, the bottom of the pusher plate 35 in contact with the food stuff can be made to have a plane surface and the slide cover 38 can be arranged so that its under surface will be in this same plane.

Extending upwardly from and integrally formed with the pusher plate 35 is a tubular extension 44 in the bore 45 of which is located the threaded upper end 46 of the shaft 25. The upper end of the extension 44 is internally threaded and the threaded portion 46 of the shaft cooperates therewith throughout an extent sufficient to cause the pusher plate 35, on rotation of the handle 33, to move downwardly through the hopper 17 until the underside of the pusher plate 35 engages the upper surface of the die 18. In order to provide this extent of movement, the shaft 25 is threaded as indicated at 46 for a distance corresponding approximately to the depth of the hopper 17.

When the pusher plate 35 occupies the lowermost position, it is desirable that some means be available in order to disengage the mechanical connection between the extension 44 and the threaded portion 46 so that it will be unnecessary to rotate the shaft 25 in a reversed direction as many times as it was rotated in a forward direction in moving the pusher plate 35 through the hopper 17.

Figure 6:
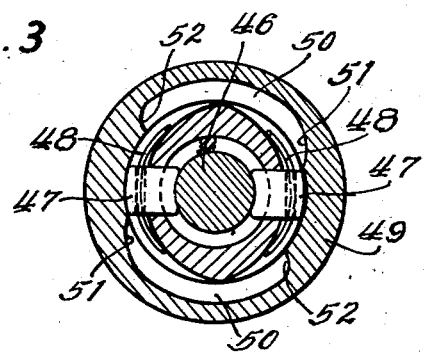
Figure 6 is a detail sectional view taken along the line 6—6 of Figure 1.

For this purpose and in order to facilitate the removal of this mechanical connection, instead of providing the extension 44 with a solid internally threaded section at its upper end, there are provided thread segments 47 which are radially movable with respect to the threaded portion 46 of the shaft 25 and are biased outwardly with respect to the same, as indicated in Figure 6, by spring wires 48. It will be observed that the thread sectors 47 are radially movable through suitable openings in the upper end portion of the extension 44 and they are arranged to be held in the positions there shown by a cap nut 49 threaded on the upper end of the extension 44. As shown in the Figure 6, the cap nut 49 has recesses 50 into which the thread segments 47 can be urged by the springs 48 when the nut 49 is rotated from the position there shown through approximately 45°. The recesses at 50 are provided with gradually sloping inclines 51 at one end to facilitate movement of the thread segments 47 from and to engagement with the threaded portion 46 of the shaft 25. At their other ends the recesses 50 have sharply sloping portions 52 to provide a stop for limiting the movement of the cap nut 49.

Figure 5:
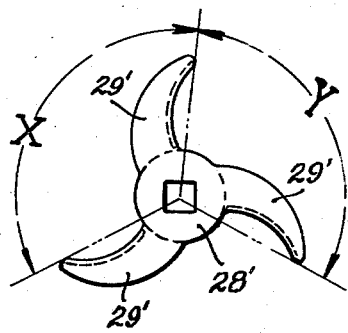
Figure 5 is a plan view of an alternate form of knife which may be used in the construction shown in Figure 1.

As previously described, the cutter or knife 28 has arms 29 which are uniformly spaced. Thus, when four arms are used, and are evenly spaced, as shown in Figure 2, all four arms 29 are caused to engage the emerging food stuff from the die 18 at the same time. This increases the torque which must be applied to the shaft 25 in order to rotate the knife 28. With a view to reducing the torque required the cutter or knife 28', as shown in Figure 5, may be used in lieu of the cutter or knife 28 previously described. It will be observed that the cutter or knife 28' has cutter arms 29' extending therefrom which are non-uniformly spaced, the angle X between two of the arms 29' being slightly greater than the angle Y between the next pair of arms, as illustrated. Obviously two or more arms can be employed and they can be non-uniformly spaced, as desired, so that only one arm at a time will cut the food stuff emerging from the die 18.

The embodiment of the invention described hereinbefore and shown Figures 1 and 2 of the drawings is arranged for vertical mounting. That is, the shaft 25 is mounted so as to rotate about a vertical axis. The food stuff is placed in the hopper 17 through the aperture 41 when the pusher plate 35 occupies the upper most position. The slide cover 38 is moved to the closed position. Thereafter, the handle 33 is rotated to cause the pusher plate 35 to move downwardly. The threaded portion 46 has a left-hand thread to permit this movement when the handle 33 is rotated in a clockwise direction as viewed from the top. At the same time the cutter or knife 28 severs the food stuff as it emerges from the openings 19 and 20 in the die 18. When the pusher plate 35 occupies its lower most position, substantially all of the food stuff has been expelled from the hopper 17. All that remains is what is located in the apertures 19 and 20 of the die 18 and between the upper surface of the latter and the under surface of the pusher plate 35. As described hereinbefore, this under surface can be made substantially a plane surface so that all of the food stuff will be pushed out of the hopper 17 and only a relatively small amount will remain in the apertures 19 and 20 and the die 18.

Figures 8, 9:
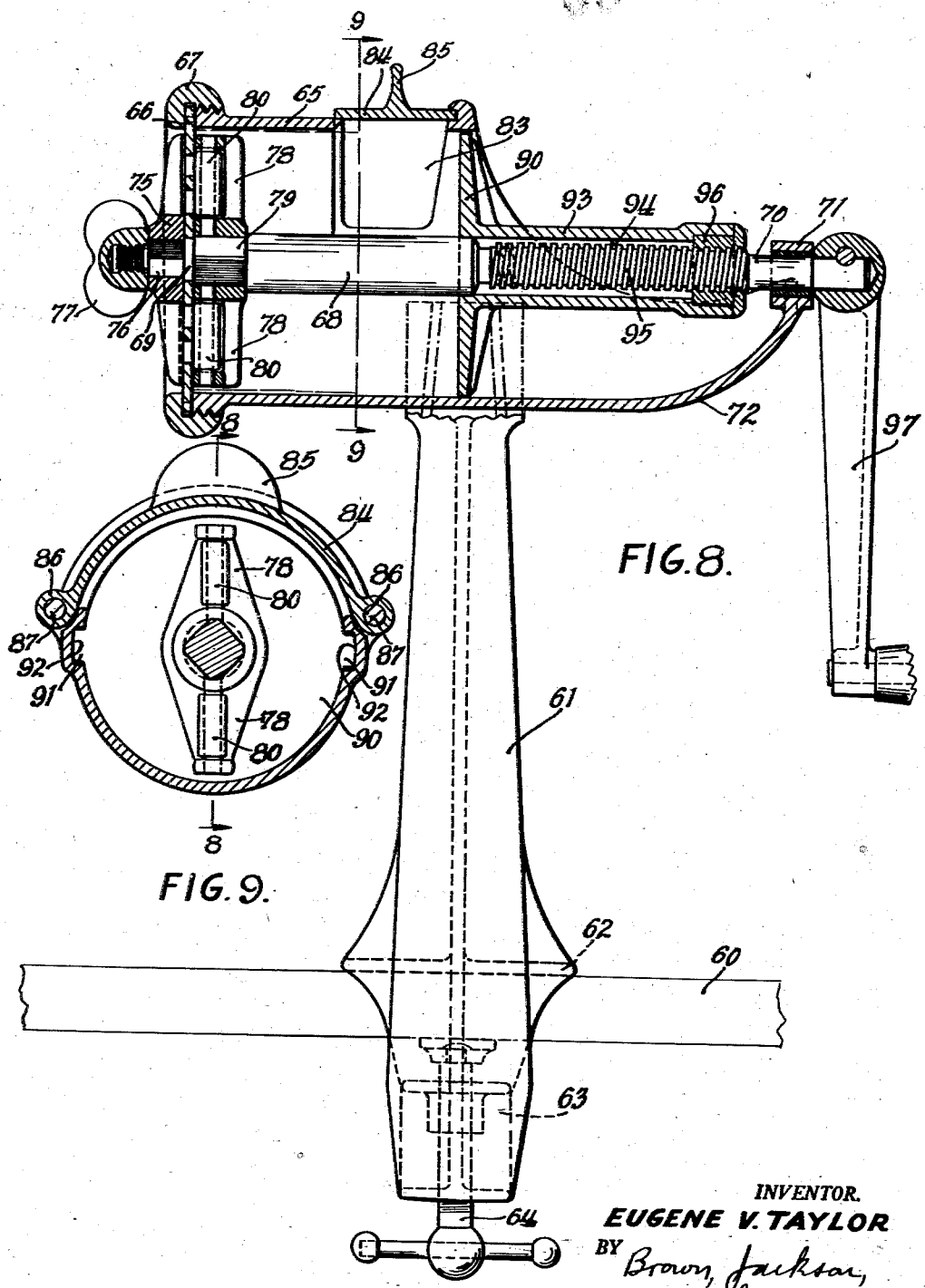
Figure 8 illustrates another embodiment of my invention, the support being shown in elevation while the hopper and parts operatively associated therewith are shown in section, the section being taken along the line 8—8 of Figure 9.
Figure 9 is a detail sectional view taken along the line 9—9 of Figure 8.

In Figures 8 and 9 of the drawings food processing apparatus arranged for horizontal operation is illustrated. As thereshown the reference character 60 designates a suitable shelf or table top for carrying a support 61. Like the support 11, the support 61 has jaws 62 and 63 integrally formed with and the screw clamp 64 cooperates with the latter jaw to clamp the support 61 to the table top 60 through the jaw 62.

Figure 7:
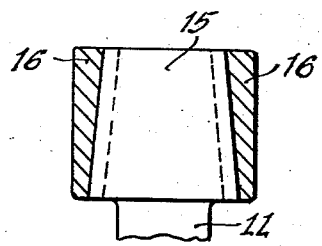
Figure 7 is a detail sectional view taken along the line 7—7 of Figure 2.

A hopper 65 is carried at the upper end of the support 61. Preferably suitable interlocking means are provided between the hopper 65 and the support 61, such as the dove-tailed construction shown in Figure 7 and described hereinbefore, to permit ready removal of the hopper 65 from the support 61. They may be formed of different materials, as desired.

At its left hand end the hopper 65 carries a die 66, corresponding to the die 18 in Figure 2, and it is held in place by a clamp nut 67.

A horizontal shaft 68 extends through the hopper 65. It has a reduced section 69 which interfits with a corresponding aperture in the die 66 and provides a bearing support for the same. At its other end the shaft 68 has a reduced section 70 that is rotatably mounted in a bearing 71 which, as shown, is carried by an extension 72 from the hopper 65.

At its left hand end the shaft 68 carries a cutter or knife 75 on a squared shank 76. The cutter or knife 75 may be similar in construction to the knife 28 shown in Figures 1 and 2 or the knife 28' shown in Figure 5 and previously described. The cutter or knife 75 is held in place on the shaft 68 by a wing nut 77.

With a view to providing additional means for forcing the food stuff from the hopper 65 through the die 66 a pair of arms 78 is provided extending radially from the shaft 68. As shown in Figure 9 the arms 78 form the opposite ends of a single member which may be removably mounted on a squared shank portion 79 of the shaft 68 as each of the arms 78 carries a roller 80 the axis rotation of which is parallel to the corresponding arms 78. It will be understood that, when the shaft 68 is rotated, the rollers 80 serve to roll the food stuff immediately in front of the same into and through the apertures in the die 66.

Food stuff may be introduced into the hopper 65 through an aperture 83 in the top portion thereof. A semicircular slide cover 84 serves to close the aperture 83. An extension 85, integrally formed with the slide cover 84 facilitates gripping of the same between the thumb and fingers so as to permit movement of the slide cover 84 along the hopper 65.

As shown more clearly in Figure 9, the ends of the slide cover 84 terminate in apertured ears 86 which are arranged to interfit with and slide along rods 87 which are carried by the hopper 65.

There is provided a pusher plate 90 for movement through the hopper 65 to push the food stuff therethrough. The pusher plate 90 is circular in shape and, as shown in Figure 9, has integrally formed projections 91 for interfitting with grooves 92 in the inner periphery of the hopper 65. The projections 91 and the grooves 92 serve to prevent relative rotation between the pusher plate 90 and the hopper 65 while permitting relative longitudinal movement therebetween.

An extension 93, integrally formed with the pusher plate 90 serves to house in its bore 94 a threaded portion 95 of the shaft 68. The extension 93 carries an internally threaded section 96 near its outer end for cooperating with the threaded portion 95 to move the pusher plate 90 through the hopper 65. If desired, the removeable thread construction, described hereinbefore and shown in Figures 1 and 6 of the drawings, can be used in lieu of the threaded portion 96, as will be readily understood.

At its extreme right end the shaft 68 is provided with a handle 97 which may be manually operated to turn the shaft 68.

The construction of the semicircular slide cover 84 and its support are such that when it is in the closed position, it is capable of resisting the outward pressure applied thereto by the pusher plate 90 as it moves the food stuff in the hopper 65 therethrough. If desired, the slide plate 84 may be arranged to be located so that its inner surface will coincide with the inner surface of the hopper 65 or the slide plate 84 may be so arranged as to be slidable entirely within the hopper 65.

In both of the embodiments of the invention shown in Figures 1 and 8 of the drawings one end of the shaft is journaled in the die. If desired, separate support means can be provided for this purpose. Moreover, it is preferable to use the die for the bearing support since the number of parts required to be dismantled is thereby reduced. The other end of the shaft finds a bearing support in the tubular extension from the pusher plate. In both constructions, the feed screw is isolated from the hopper and thus is prevented from coming into contact with the food stuff. As a result, it is a simple matter to clean the threads of the feed screw since none of the food stuff can come in contact therewith.

It will be apparent that the supports shown in Figures 1 and 8 of the drawings can be arranged for interchangeable mounting of other devices, such as juicers, power or manually operable mixers and the like. Thus a single support can be provided for several devices each of which is adapted to accommodate itself to the dove-tail or equivalent mounting of the support.

Since other changes can be made in the foregoing constructions and different embodiments of the invention can be made without departing from the spirit and scope thereof, it is intended that all matters shown in the accompanying drawings and described hereinbefore shall be interpreted as illustrative and not in a limiting sense.

I claim as my invention:

1. Apparatus for processing food stuff, such as meat, comprising, in combination, a hopper for receiving the food stuff, a die at one end of the hopper through which the food stuff is pressed, a shaft rotatably mounted in said hopper and exposed to the interior thereof and extending through and beyond the other end thereof, the portion of said shaft extending from said hopper being threaded for a distance about equal to the length of said hopper with the portion of said shaft within said hopper being completely smooth, means for rotating said shaft, a knife carried by said shaft and rotatable therewith adjacent said die for cutting said food stuff as it emerges therefrom, a pusher plate movable through said hopper for pushing said food stuff through said die, and an extension from said pusher plate having a threaded outer end for cooperating with said threaded portion of said shaft to move said pusher plate through said hopper on rotation of said shaft.

2. Apparatus for processing food stuff, such as meat, comprising, in combination, a hopper for receiving the food stuff, a die at one end of the hopper through which the food stuff is pressed, a shaft rotatably mounted in said hopper and exposed to the interior thereof and extending through and beyond the other end thereof, the portion of said shaft extending from said hopper being threaded for a distance about equal to the length of said hopper with the portion of said shaft within said hopper being completely smooth, means for rotating said shaft, a knife carried by said shaft and rotatable therewith adjacent said die for cutting said food stuff as it emerges therefrom, a pusher plate movable through said hopper for pushing said food stuff through said die, and a tubular extension from said pusher plate providing a guide for the portion of said shaft within said hopper and having the outer end internally threaded for cooperating with said threaded portion of said shaft to move said pusher plate through said hopper on rotation of said shaft.

3. The invention, as set forth in claim 2, wherein the pusher plate is provided with an aperture through which the food stuff may be placed in the hopper, and a closure for said aperture.

4. The invention, as set forth in claim 2, wherein the knife has a plurality of radially projecting blades with each being unequally spaced with respect to the next adjacent blades on opposite sides thereof to distribute the cutting action thereof and thereby reduce the torque required to rotate the shaft.

5. Apparatus for processing food stuff, such as meat, comprising, in combination, a hopper for receiving the food stuff, a die at one end of the hopper through which the food stuff is pressed, a shaft rotatably mounted in said hopper and extending through and beyond the other end thereof, means for rotating said shaft, a knife carried by said shaft and rotatable therewith adjacent said die for cutting said food stuff as it emerges therefrom, an arm means extending radially from and rotatable with said shaft inside said hopper adjacent said die, a roller carried by each arm with its axis of rotation parallel thereto on the side adjacent said die for pushing the food stuff into and through said die, a pusher plate movable through said hopper for pushing said food stuff toward said rollers and die, and cooperating threaded means on said shaft and pusher plate for moving the latter through said hopper on rotation of the former.

EUGENE V. TAYLOR.

REFERENCES CITED

The following references are of record in the file of this patent:

UNITED STATES PATENTS

| Number | Name | Date |
| --- | --- | --- |
| 43,427 | Perry | July 5, 1864 |
| 730,140 | Mann | June 2, 1903 |
| 732,900 | Schlussel | July 7, 1903 |
| 2,183,114 | Bonapace | Dec. 12, 1939 |
| 2,333,669 | Ness | Nov. 9, 1943 |
| 2,382,811 | Papkin | Aug. 14, 1945 |

FOREIGN PATENTS

| Number | Country | Date |
| --- | --- | --- |
| 127,743 | Austria | Apr. 11, 1932 |
| 88,118 | Germany | Aug. 15, 1896 |
| 451,463 | Germany | Oct. 20, 1927 |
| 292,722 | Great Britain | June 28, 1928 |
| 15,642 | Norway | Oct. 15, 1906 |